United States Patent
Cohen et al.

(10) Patent No.: US 10,552,392 B1
(45) Date of Patent: Feb. 4, 2020

(54) DATA-TEMPERATURE-BASED MAPPING IN A DATABASE SYSTEM

(71) Applicant: Teradata US, Inc, Dayton, OH (US)

(72) Inventors: Steven B Cohen, Redondo Beach, CA (US); Bo H Tan, Cypress, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 14/043,449

(22) Filed: Oct. 1, 2013

Related U.S. Application Data

(60) Provisional application No. 61/709,147, filed on Oct. 2, 2012.

(51) Int. Cl.
*G06F 17/30* (2006.01)
*G06F 16/22* (2019.01)

(52) U.S. Cl.
CPC .................................. *G06F 16/22* (2019.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 7,363,308 B2 * | 4/2008 | Dillon ................. | G06F 17/3061 707/706 |
| 2011/0300826 A1 * | 12/2011 | Chang ................. | H04L 12/1403 455/405 |
| 2012/0278512 A1 * | 11/2012 | Alatorre ............... | G06F 3/0605 710/33 |
| 2013/0204886 A1 * | 8/2013 | Faith ................. | G06Q 30/0631 707/756 |

* cited by examiner

*Primary Examiner* — Sana A Al-Hashemi
(74) *Attorney, Agent, or Firm* — Randy L. Campbell, Jr.

(57) ABSTRACT

A database system may include a storage array that includes a plurality of storage devices configured to store a database. The database system may further include a processor in communication with the memory device. The processor may determine frequency of data values of a first set of data from the database. The frequency of data values are determined at a predetermined data granularity. The processor may also generate a data object to include information indicative of the frequency of data values. The processor may also store the data object in the storage array. A method and computer-readable medium may also be implemented.

17 Claims, 6 Drawing Sheets

| HEADER | | |
|---|---|---|
| GENERAL INFORMATION <br> 302 | VERSION <br> NUMBER OF ENTRIES <br> . . . | 3 <br> 3 |
| TEMPERATURE DETERMINATION INFORMATION <br> 304 | DISTRIBUTION MODEL <br> MEAN <br> STANDARD DEVIATION <br> MATURITY CONSTANT <br> . . . | NORMAL <br> 34.2790 <br> 3.2889 <br> 128.8392 |
| DEBUGGING INFORMATION <br> 306 | TIME OF GENERATION <br> SYSTEM NAME <br> . . . | 29-FEB-12 <br> L328PC09 |

| RANGE OF OBJECTS | TEMPERATURE |
|---|---|
| OBJECT 0 TO OBJECT 8 | 38.8729 |
| OBJECT 9 TO OBJECT 12 | 28.8319 |
| OBJECT 13 | 34.3890 |
| OBJECT 14 | 38.2830 |
| OBJECT 15 TO OBJECT 28 | 31.3820 |
| OBJECT 29 TO OBJECT 32 | 38.3471 |

310   312

308

300

DATA-TEMPERATURE-BASED MAPPING IN A DATABASE SYSTEM

CLAIM OF PRIORITY

This application claims the benefit of priority under 35 U.S.C. 119(e) of U.S. Provisional Patent Application Ser. No. 61/709,147 filed on Oct. 2, 2012, which is herein incorporated by reference in its entirety.

BACKGROUND

1. Technical Field

The present disclosure relates generally to database systems, and in particular, to historical database data usage information in a database system.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

During operation of database systems, it may become necessary to move data off of storage devices due to backups, data replication, system configurations, etc. In making such a move, historical data information may be lost. Thus, it may be beneficial to maintain historical information regarding database data in order to facilitate selective organization of the data when moved back into storage.

SUMMARY

In one aspect of the present disclosure, a database system may include a storage array that includes a plurality of storage devices configured to store a database. The database system may further include a processor in communication with the memory device. The processor may determine frequency of data values of a first set of data from the database. The frequency of data values are determined at a predetermined data granularity. The processor may also generate a data object to include information indicative of the frequency of data values. The processor may also store the data object in the storage array.

In another aspect of the present disclosure, a method may include monitoring usage of database data in a database system. The method may further include quantifying the usage of the database data. The method may further include generating a data object configured to include the quantified usage of the database data. The method may further include storing the data object in a storage device.

In another aspect of the present disclosure, a computer-readable medium may be encoded with instructions executable by a processor. The instructions may include instructions to monitor usage of database data in a database system. The plurality of instructions may further include instructions to generate at least one metric indicative of the usage of the database data in the database system. The instructions may further include instructions to determine values associated with usage of the database based on the metric. The plurality of instructions may further include instructions to create a data object to include the determined values. The plurality of instructions may further include instructions to store the data object.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

FIG. 3 is an example of a heat map.

DETAILED DESCRIPTION OF THE DRAWINGS

Figure 1:
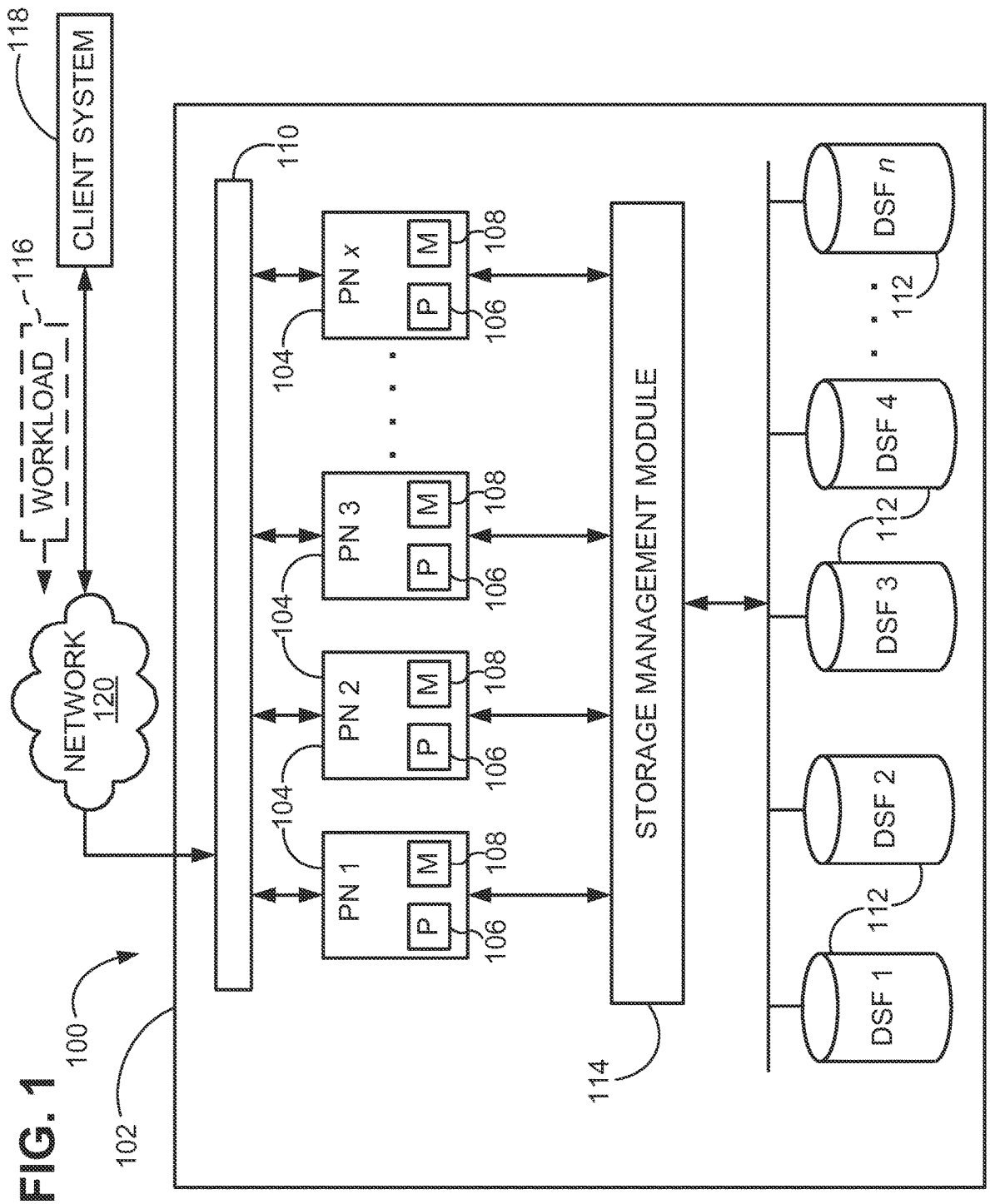
FIG. 1 is a block diagram of an example database system.

FIG. 1 is a diagrammatic representation of example architecture for a database system 100. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memories, etc.). In the example of FIG. 1, the RBDMS 102 may be a massive parallel processing (MPP) system having an array of processing units and distributed memory and storage. In alternative examples, the RBDMS 102 may implement a single processing unit, such as in a symmetric multiprocessing (SMP) system configuration.

The RBDMS 102 may include one or more processing units used to manage the storage, retrieval, and manipulation of data in the data-storage facilities. The array of processing units may include an array of processing nodes (PN) 104 that manage the storage, retrieval, and manipulation of data included in a database. In FIG. 1, the processing nodes 104 are individually indexed as PN 1 through PN x, where x may represent the total number of processing nodes 104 in the database system 100 or, alternatively, may represent the total number of active processing nodes 104 in the database system.

Each of the processing nodes 104 may include one or more processors 106 and one or more memories 108. The memory 108 may include one or more memories and may be computer-readable storage media or memories, such as a cache, buffer, RAM, removable media, or other computer-readable storage media. Computer-readable storage media may include various types of volatile and non-volatile storage media. Various processing techniques may be implemented by processors, such as the processor 106, such as multiprocessing, multitasking, parallel processing and the like, for example.

Each of the processing nodes 104 may communicate with one another through a communication bus 110. The communication bus 110 allows communication to occur within and between each processing node 104. For example, implementation of the communication bus 110 provides media within and between each processing node 104 allowing communication among the various processing nodes 104 and other component processing units. The communication bus 110 may be hardware, software, or some combination thereof. In instances of at least a partial-hardware implementation of the communication, the hardware may exist separately from any hardware (e.g., processors, memory, physical wires, etc.) included in the processing nodes 104 or may use hardware common to the processing nodes 104. In instances of at least a partial-software implementation of the communication bus 110, the software may be stored and executed on one or more of the memories 108 and processors 106, respectively, of the processing nodes 104 or may be stored and executed on separate memories and processors that are in communication with the processing nodes 104. In one example, the communication bus 110 may include multi-channel media such that if one channel ceases to properly function, another channel may be used. Additionally or alternatively, more than one channel may also allow distributed communication to reduce the possibility of an undesired level of communication congestion among processing nodes 104.

The RBDMS 102 may include an array of data storage facilities (DSFs) 112. The DSFs 112 may include persistent storage devices such as hard disk drives, solid state drives, or any other suitable non-volatile storage/memory devices where data may be persistently stored. The DSFs 112 may include various types of persistent storage devices with varying degrees of performance. Such degrees of performance may involve how quickly data can be retrieved from a particular DSF 112. In conventional databases, retrieval time of data is a crucial aspect of overall performance. Thus, it is more efficient to store database data most likely to be accessed with greater frequency than other database data in devices that allow faster retrieval. In FIG. 1, the DSFs 112 are individually indexed as 1 through n where n is the number of DSFs 112. In addition, location of stored data within each persistent storage device itself may also affect how quickly data may be retrieved from each persistent storage device.

Figure 2:
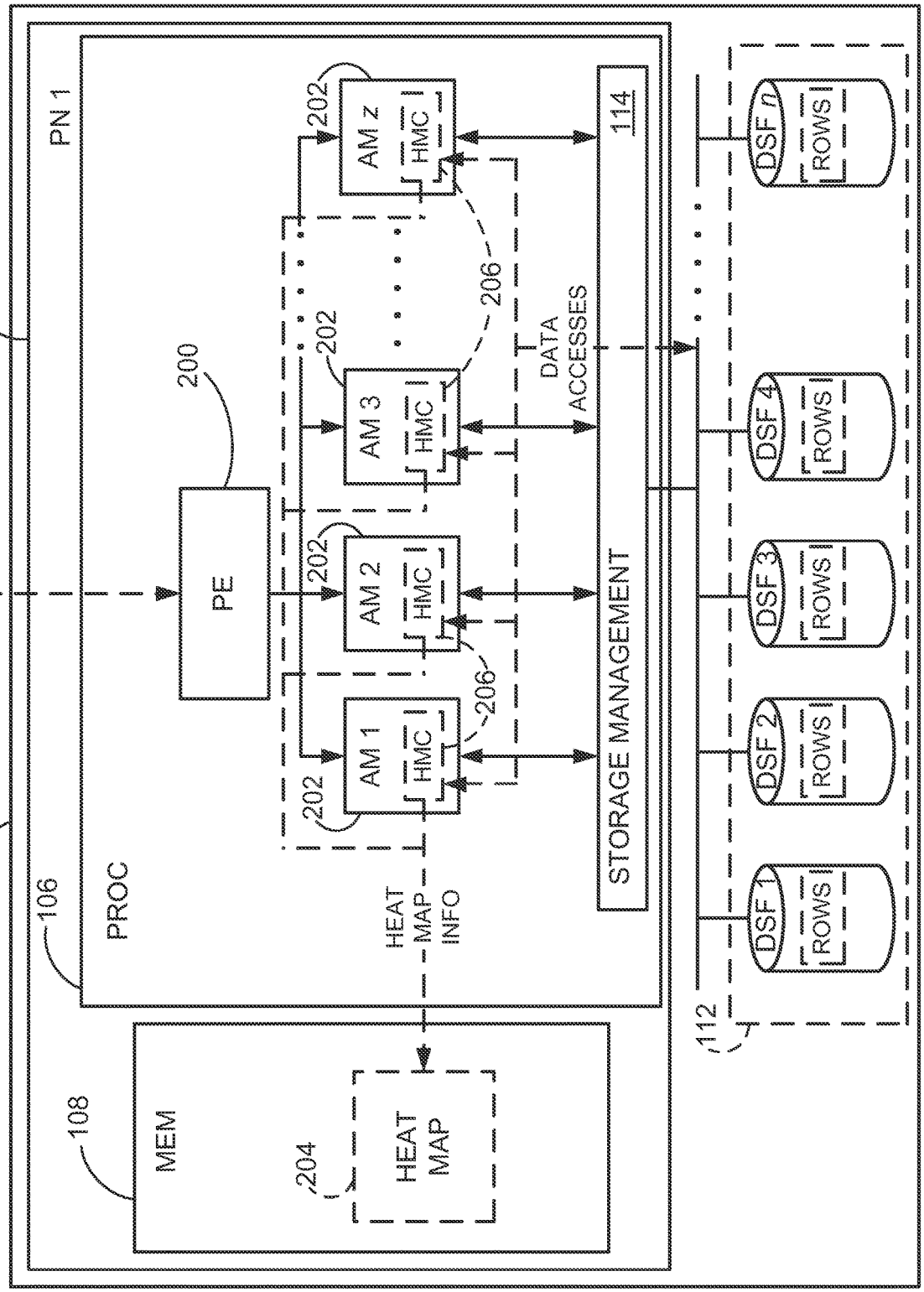
FIG. 2 is an example of operation of the database system of FIG. 1.

In one example, and as discussed in further detail with regard to FIG. 2, a storage management module 114 may determine on which persistent storage device(s) of the DSFs 112 that particular database data is to be stored. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

During operation, a workload 116 may be initially transmitted via a client system 118 to the RBDMS 102. In one example, the workload 116 may be transmitted over a network 120. The network 120 may be wired, wireless, or some combination thereof. The network 120 may be a virtual private network, web-based, directly-connected, or some other suitable network configuration. In one example, the client system 118 may run a dynamic workload manager (DWM) client (not shown). Alternatively, the database system 100 may include a mainframe (not shown) used to interact with the RBDMS 102. The workload 116 may include one or more database tasks to be performed by the RBDMS 102. For example, the workload 116 may contain any combination of queries, database utilities (e.g., data insertion or deletion), as well as, any other type of database-related activity.

FIG. 2 is an example of a block diagram of a portion of the RBDMS 102 that includes a single processing node 104. Each processing node 104 may include one or more parsing engine (PE) modules 200 and one or more access modules (AM) 202. In one example, the access modules 202 may be access module processors (AMPs), such as those implemented in the Teradata Active Data Warehousing System®. The parsing engine modules 200 and the access modules 202 may each be virtual processors (vprocs) and/or physical processors. In the case of virtual processors, the parsing engine modules 200 and access modules 202 may be executed by one or more physical processors 106, such as those included in the processing nodes 104. For example, in FIG. 2, the parsing engine module 200 and access module 202 is associated with a respective processing node 104 and may each be executed as one or more virtual processors by physical processors 106 included in the respective processing node 104. In FIG. 2, each processing node 104 is shown as including a single parsing engine module 200 and multiple access modules 202, such that there are more parsing engine modules 200 and access modules 202 total than processing nodes 104. In one example, during operation, the one or more physical processors 106 included in the processing nodes 104 may execute the parsing engine modules 200 and access modules 202 by switching between the executions of the various modules at a rapid rate allowing the vprocs to substantially operate in "parallel."

During operation, the parsing engine modules 200 may receive the workloads 116 and determine the content and generate instructions to execute tasks associated with the workloads 116. The parsing engine module 200 processing the workload 116 may transmit specific instruction to access modules 202 having a common processing node 104 or a different one. The access modules 202 may execute the instructions in parallel to carry out activities related to the processed workload 116. In most scenarios, carrying out the activities includes accessing stored database information, such as database tables.

During operation, the storage management module 114 may arrange data in the DSFs 112 according to a frequency of data. In one example, frequency of data may be may include the frequency with which data in the DSFs 112 is accessed, as well as, the "priority" of the data. The priority of the data may be identified by assigning an initial frequency of data value associated with data as it is initially loaded into the RBDMS 102. The frequency of data may then be a value that is based on both the access frequency and the priority of the data.

The frequency of data may also be referred to as the "temperature" of the data. Reference to the temperature of the data provides a qualitative description of the quantitative frequency of the data. Thus, the higher the frequency of data, the higher the "temperature" of the data. For purposes of this disclosure, reference to the "temperature" of data may be considered as referring to the quantitative value of the frequency of data. For example, data having a higher frequency of data compared to other data may be referred to as being "hotter" than the other data and the other data may be referred to as being "colder" compared to the data having the higher frequency of data. For purposes of this disclosure, reference to the "temperature value" or "data temperature value" of data may be considered as referring to the quantitative value of the frequency of data.

The storage management module 114 may evaluate data temperature at a particular level of granularity. For example, the storage management module 114 may evaluate data temperature at a "cylinder" level, such as that used in "Teradata Virtual Storage® (TVS)" systems by Teradata Corporation of Dayton, Ohio. In one example, a cylinder of data may be approximately 2 to 11 MB in size. A single cylinder may exist in one storage device or across multiple ones in the DSFs 112.

In typical database systems, one or more events may require database data to be moved off of the DSFs 112. For example, data backup operations, data replication, system reconfigurations, etc., may require this database data movement. Typically, in such scenarios, historical information regarding data temperature is lost. As a result, once the data is returned to the DSFs 112, there is no information of how to store the data based on data-temperature considerations. Thus, in one example, the RDBMS 102 may maintain a heat map 204 to store current frequency of data values associated with database data at a particular level of granularity.

In one example, the access modules 202 may update the heat map 204 based on the frequency of data accesses of the database data in the DSFs 112. As data is requested based on various workload operations, the access modules 202 may update the frequency of data values in the heat map 204. Updates may occur periodically, based on occurrence of predetermined conditions or through manual initiation. In one example, the levels of granularity for which the frequency of data values are maintained in the heat map 204 may be different than that maintained by the storage management module 114. Each access module 202 may execute a heat map conversion (HMC) 206, which allows each access module 202 to determine the frequency of data values for data at a particular level of granularity.

In FIG. 2, the heat map 204 is shown as residing in the memory 108 of the processing node 104. In operation, the heat map 204 may be stored in the DSFs 112 or some other storage device and loaded into memory when desired by the access modules 202. Each access module 202 may have a respective portion of the associated processing-node memory 108 dedicated for use. Thus, in alternative examples, each access module 202 may access a particular portion of the heat map 204 for updating of frequency of data values. In other examples, the access modules 202 may maintain changes to the heat map 204 in the memory 108 and subsequently update the stored heat map 204 to reflect the changes.

FIG. 3 is an example of the heat map 204. In one example, the heat map 204 may include not only the frequency of data values, but also information related to various aspects regarding the heat map 204 itself. For example, the heat map 204 may include a header 300. The header 300 includes general information 302, temperature characterization information 304, and debugging information 306. The general information 302 may include information related to the heat map 204 such as the version number of the current heat map 204, as well as, the number of entries that have been currently made to the heat map 204.

The temperature characterization information 304 includes information related to the actual temperature determination procedure, which may include algorithms, equations, and/or relationships used to generate the frequency of data values. In one example, this temperature determination information may include the level of data granularity at which the frequency of data values are determined, such as rows, partitions, data blocks, extents, cylinders, etc. In FIG. 3, the temperature characterization information 304 includes the distribution model type, mean, standard deviation, and maturity constant, all of which can be used to recreate the temperature determination procedure used to determine the frequency of data values.

The debugging information 306 may be used to debug an issues arising with the heat map 204. The debugging information may include the time of generation of the heat map 204, as well as, the particular system name used to create the heat map. The information shown in the header 300 of FIG. 3 should not be considered exhaustive. Other information may be included in the header 300 to further define the particular heat map 204.

The heat map 204 includes the frequency of data information 308. In FIG. 2, the "RANGE OF OBJECTS" section includes an object array 310, which lists each "object" of which the frequency of data value is determined. For example, each object may represent an extent of data, data block, partition, or database table rows. The objects may be grouped when data temperatures are approximately equal. The frequency of data values 312 are updated during operation with the increase or decrease of frequency of data values.

Figure 4:
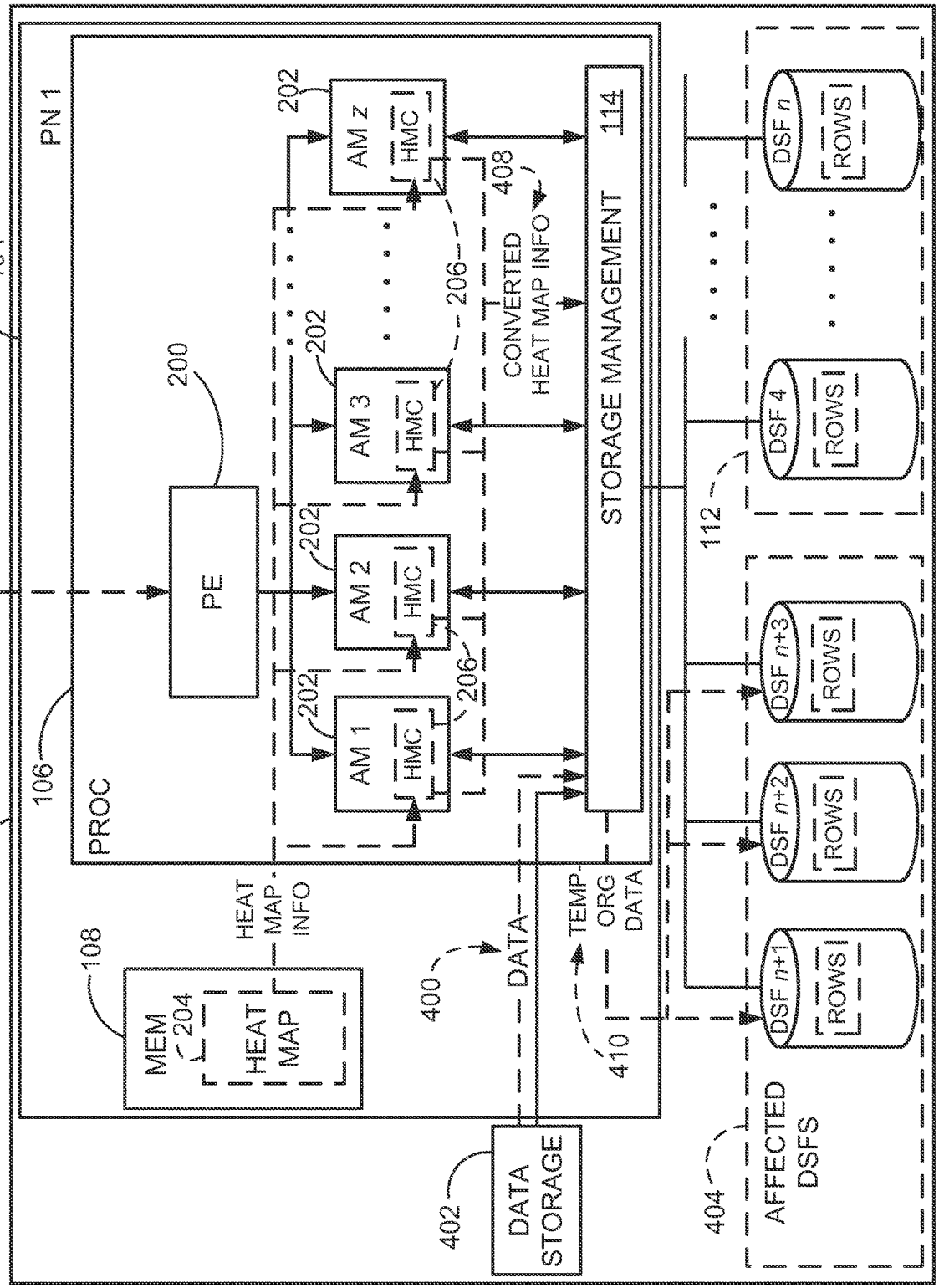
FIG. 4 is an example of further operation of the database system of FIG. 1.

In scenarios involving data being moved off the DSFs 112, the heat map 204 may be used to relocate the data according to temperature-based considerations. In FIG. 4, data that has been previously moved off of the DSFs 112, data 400, may be brought back onto the DSFs 112 from a data storage device 402. The data storage device 402 may represent temporary storage and/or memory for the data 400, such as temporarily-connected storage and/or memory devices. The data storage device 402 may also represent extra space in the DSFs 112 or some temporary or permanent storage arrangement.

In the example of FIG. 4, DSFs 1, 2, and 3 have been replaced by DSFs n+1, n+2, and n+3. This may represent various scenarios, such as total replacement of DSFs 1, 2, and 3, reconfigured DSFs 1, 2, 3 or some other alteration. Thus, DSFs n+1, n+2, and n+3 may simply be designated as "affected DSFs" 404 in FIG. 4 to represent any scenario dealing with relocated data. Once the affected DSFs 404 are in condition to receive the data, data relocation instructions 406 may be provided to the access modules 202.

Upon receipt of the instructions, each instructed access module 202 may identify data temperature values associated with the data 400 to be relocated. In one example, the data temperature values contained in the heat map 204 associated with the data 400 may be retrieved by the access modules 202. The data temperature values may be for previously-determined data-granularity levels. Some or all of the access modules 202 participating in the data relocation may receive portions of the data 400. In scenarios in which data 400 is being used in a new database system, different temperature determination functions may be used by a storage management module 114 than was previously used. In such situations, the access modules 202 may determine if a new temperature determination function is to be used. If one is to be used, through the heat map conversion 206, the access modules 202 may convert the current data temperature values of the heat map 204 to the new temperature determination operation.

If no new temperature determination operation is to be used or after such conversion is complete, the access modules 202 may, if necessary, convert the array element temperature value to correspond to the granularity level used by the storage management module. The converted heat map information 408 may be provided to the storage management module 114. The storage management module 114 may use the data temperature values to place the data 400 into the affected DSFs 404 in a temperature-based arrangement (as temperature-organized data 410), such as the hottest data being placed in storage device locations providing the relatively-fastest data access. The heat map 204 may be updated to reflect the temperatures of the data 400 and the storage management module 114 may update any temperatures associated with the data 400.

In alternative examples, the heat map conversion 206 may be executed by the storage management module 114, in situations giving rise to a need for the heat map 204 (e.g. data backup operations, data replication, system reconfigurations, etc.). When the heat map 204 is desired, relevant data may be fed directly into the access modules 202 from the DSFs 112. Each access module 202 receiving data may determine the granularity of the received data and identify the corresponding data temperatures in the heat map 204. These data temperatures are then sent to the storage management module 114 to determine if the heat map conversion 206 is to be performed. In such alternative examples, the access modules 202 do not maintain the heat map 204, relying on the storage management module 114 to handle such responsibility. Additionally, the heat map 204 may be transient in nature and generated at desired times by the storage management module 114 without being persistently stored. In the alternative examples, the access modules 202 may periodically, or at other predetermined times, receive a requested snapshot of the heat map 204 for analysis and processing.

Figure 5:
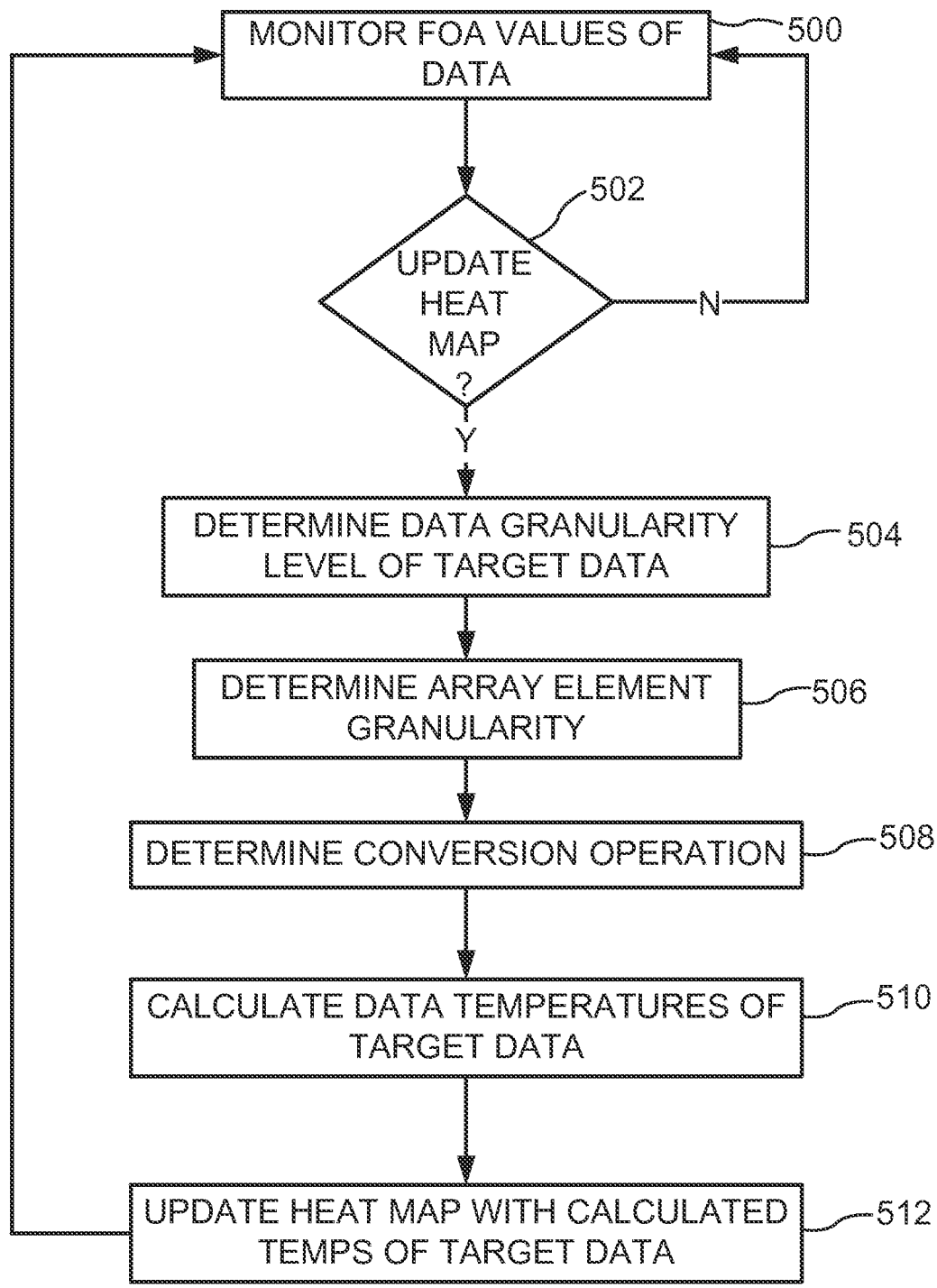
FIG. 5 is an operational flow diagram of example operation of the database system of FIG. 1.

FIG. 5 is an operational flow diagram of example operation of the RBDMS 102. In one example, the frequency of access (FOA) values for particular data may be monitored (500). In one example, data temperature values may be determined at a particular data-granularity level by the storage management module 114, such as at the cylinder level. The access modules 202 may routinely be instructed to update the heat map 204 during predetermined time windows or during particular system conditions, such as low-usage. The determination to update the heat map 204 (502) may be made at the file system level of the RBDMS 102. If no update is to be performed, the data temperatures may continue to be monitored.

If an update is to be performed, the data-granularity level currently used to monitor data temperature values in DSFs 112 may be determined (504). With regard to the heat map 204, the array element granularity may be determined (506). Such determination allows the access modules 202 to recognize if the data-granularity level currently used to monitor data temperature values in the DSFs 112 needs to be converted to a different granularity level used in the heat map 204. Upon such determination, a determination regarding the conversion operation may be performed (508). Such determination may identify the operations and/or algorithms that generate the data temperature values for the data currently being monitored in the DSFs 112 and the data temperature values in the heat map 204.

The data temperature values of the data targeted for the heat map update may be calculated through the conversion, if needed, of the data temperature values being kept for the targeted data stored in the DSFs 112 (510). The heat map 204 may be updated with the calculated data temperature values, converted or unconverted (512). The data temperature values may continue to be monitored until the next heat map update is to occur.

In alternative examples, the storage management module 114 may be responsible for maintaining temperature data. In such an example, the heat map updates may be executed by the storage management module 114 based on data granularity comparisons between stored data in the DSFs 112 and the granularity used in the heat map 204 that is performed by the access modules 202. In such alternative examples, the storage management module 114 may perform any conversions associated with the heat map 204 data temperatures. In addition, the access modules 202 may periodically, or at specified intervals, receive a requested snapshot of the heat map 204 for analysis and processing.

Figure 6:
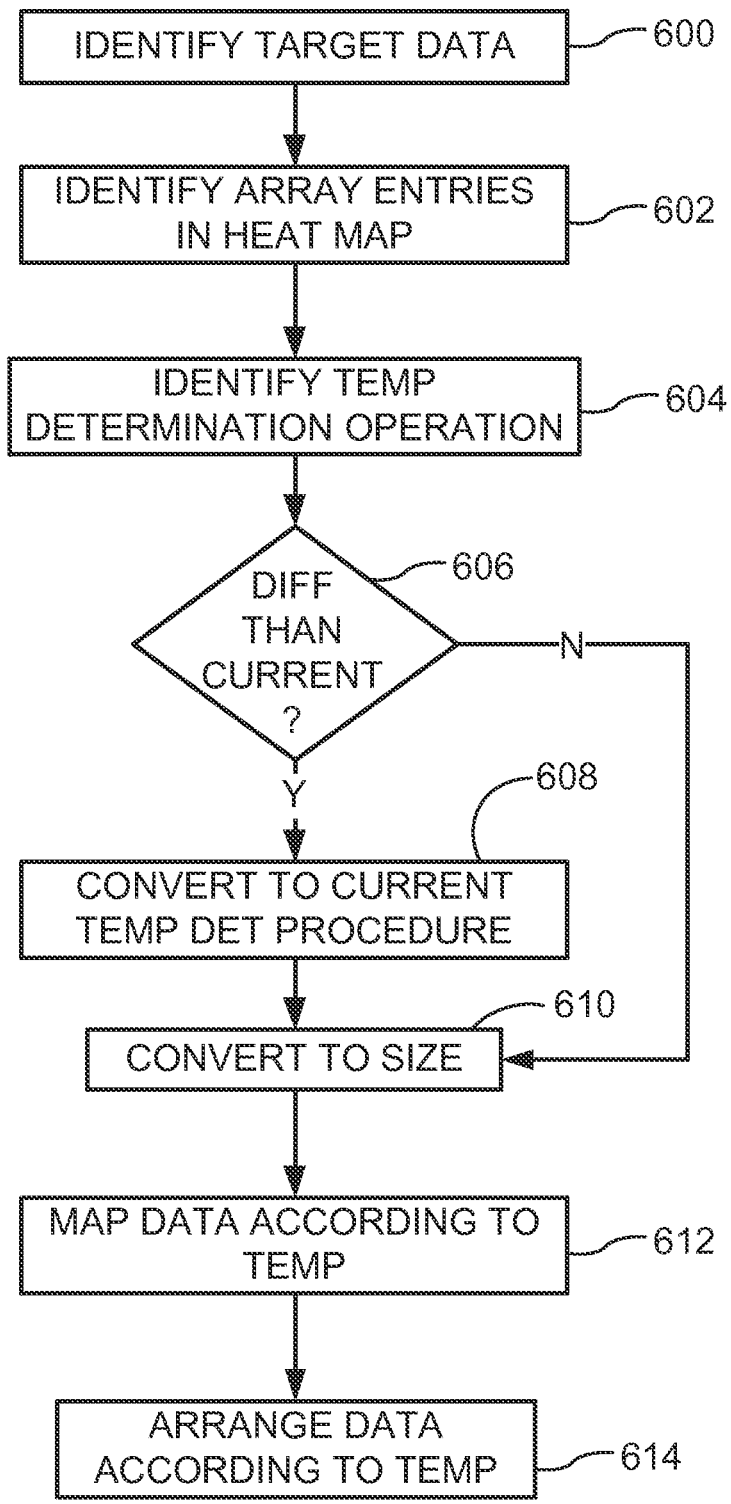
FIG. 6 is an operational flow diagram of example operation of the database system of FIG. 1.

FIG. 6 is an operational flow diagram of example operation of the RBDMS 102 during usage of the heat map 204 for data relocation. In one example, target data for relocation may be identified (600). Relocation may be performed due to a number of circumstances. Upon identification of the targeted data, the array entries in the heat map 204 corresponding to the targeted data may be identified (602). The temperature determination procedure used to determine the data temperature values in the heat map 204 for the target data may be identified (604) in order to determine if a conversion to another temperature determination operation is to occur. The temperature determination procedure associated with the heat map 204 may be compared to the temperature determination procedure to be used by the storage management module 114 (606).

If the temperature determination procedures are different, the temperature determination procedure currently being used for the heat map 204 may be converted to the other temperature determination procedure to be used by the storage management module 114 (608). Upon completion of conversion or if no conversion is needed, the data temperature values are converted to reflect the size at which the storage management module 114 monitors the data temperature values (610), such as at the cylinder level. Using these data temperature values as a map, the data 402 may be organized for relocation into the affected DSFs 404 based on the data temperature values (612). The data may then be placed into the affected DSFs 404 according to the mapping (614).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A database system comprising:
   a storage array that includes a plurality of storage devices configured to store a database;
   a processor in communication with the storage array, the processor configured to:
   determine frequency of data values of a first set of data from the database, wherein the frequency of data values are determined at a predetermined data granularity, wherein each frequency of data value is based on at least one of access frequency of a respective portion of the first set of data and a priority of the respective portion of the first set of data, wherein the access frequency is indicative of the frequency at which the first data set of data is accessed from the database relative to other data sets of the data;
   generate a data object to include information indicative of the frequency of data values;
   store the data object in the storage array;
   identify a first temperature determination procedure used to determine the frequency of data values of the first set of data;

determine a second temperature determination procedure to be used to determine alternative frequency of data values, wherein the second temperature determination procedure is different than the first temperature determination procedure;

determine alternative frequency of data values of the first set of data based on the second temperature determination procedure;

update the data object to include the alternative frequency of data values; and store the updated data object in the storage device.

2. A method comprising:

monitoring, with a processor, usage of database data of a common database stored in a database system;

quantifying, with the processor, a usage pattern of the database data using a first data usage quantification procedure based on the monitored usage, wherein the usage pattern is indicative of relative respective usages of different portions of the database data of the common database;

generating, with the processor, a data object configured to include the quantified usage pattern of the database data;

storing, with the processor, the data object in a storage device;

determining, with the processor, that usage pattern of the database data is to be quantified based on a second data usage quantification procedure different from the first data usage quantification procedure, wherein the second data usage quantification is based on level of data granularity;

retrieving, with the processor, the data object;

converting, with the processor, the quantified usage pattern of database data based on the first data usage quantification procedure to a quantified usage pattern of database data based on the second data usage quantification procedure;

updating, with the processor, the data object to include the converted quantified usage pattern of database data; and storing, with the processor, the updated data object.

3. A computer-readable medium encoded with a plurality of instructions executable by a processor, plurality of instructions comprising:

instructions to monitor usage patterns of database data of a common database in a database system;

instructions to generate at least one metric indicative of the usage patterns of the database data in the database system using a first usage quantification procedure, wherein the usage pattern is indicative of relative respective usages of different portions of the database data;

instructions to determine values associated with the usage patterns of the database data based on the metric;

instructions to create a data object to include the determined values;

instructions to store the data object;

instructions to determine that usage pattern of the database data is to be quantified based on a second data usage quantification procedure different from the first data usage quantification procedure, wherein the second data usage quantification procedure is based on a level of data granularity;

instructions to retrieve the data object;

instructions to convert the metric based on the first data usage quantification procedure to a second metric based on the second data usage quantification procedure;

instructions to update the data object to include the converted metric; and instructions to store the updated data object.

4. The database system of claim 1, wherein the processor is further configured to determine the frequency of data values based on a data temperature determination procedure that includes at least one equation.

5. The database system of claim 1, wherein the processor is further configured to:

determine that the first set of data is to be relocated to at least one storage device different from those included in the storage array;

retrieve the data object from the storage array;

determine a distribution of the first set of data in the at least one different storage device based on the information indicative of the frequency of data values; and store the first set of data in the at least one storage device in accordance with the distribution.

6. The database system of claim 1, wherein the processor is further executable to:

determine that the first set of data is to be relocated to at least one different storage device different from the storage array;

retrieve the updated data object;

determine a distribution of the first set of data in the at least one different storage device based on the information indicative of the alternative frequency of data values; and relocate the first set of data to the at least one storage device in accordance with the distribution.

7. The method of claim 2, further comprising determining, with the processor, a different level of data granularity, wherein quantifying, with the processor, the usage pattern of the database data comprises quantifying, with the processor, the usage pattern of the database data at the different level of data granularity.

8. The method of claim 2, wherein monitoring, with the processor, usage of the database data of the common database stored in a database system comprises monitoring, with the processor, access frequency of the database data of the common database by the database system.

9. The method of claim 2, wherein quantifying, with the processor, the usage pattern comprises determining, with the processor, frequency of data values of database data based on the database data usage pattern.

10. The method of claim 2, further comprising relocating, with the processor, the database data to storage devices of the different database system based on the converted quantified usage pattern of database data.

11. The computer-readable medium of claim 3, wherein the instructions to generate the at least one metric indicative of the usage patterns of the database data in the database system comprises instructions to generate the at least one metric based on the frequency of data.

12. The computer-readable medium of claim 3, wherein the instructions to create the data object comprises instructions to create the data object to include at least one algorithm used to generate the determined values.

13. The computer-readable medium of claim 3, wherein the plurality of instructions further comprise instructions to update the data object at a time based on resource usage conditions associated with the database system.

14. The computer-readable medium of claim 3, wherein the plurality of instructions further comprise instructions to determine a different level of data granularity, wherein the instructions to determine values associated with the usage patterns of the database data based on the metric comprises instructions to determine the values at the different level of data granularity.

15. The computer-readable medium of claim 3, wherein the plurality of instructions further comprise instructions to create the data objects to include the version of the data object.

16. The database system of claim 6, wherein processor is further executable to generate the data object to include header information that includes information related to calculation of the frequency of data values.

17. The method of claim 8, wherein quantifying, with the processor, the usage pattern comprises quantifying, with the processor, the usage pattern based on the access frequency.

* * * * *